Jan. 1, 1924. 1,479,504
A. O. HUBBARD
WHEEL
Filed Sept. 22, 1922

Inventor
ARTHUR O. HUBBARD
By Paul, Paul & Moore
ATTORNEYS

Patented Jan. 1, 1924.

1,479,504

UNITED STATES PATENT OFFICE.

ARTHUR O. HUBBARD, OF MINNEAPOLIS, MINNESOTA.

WHEEL.

Application filed September 22, 1922. Serial No. 589,801.

*To all whom it may concern:*

Be it known that I, ARTHUR O. HUBBARD, a citizen of the United States, resident of Minneapolis, county of Hennepin, State of Minnesota, have invented certain new and useful Improvements in Wheels, of which the following is a specification.

The object of this invention is to provide a disc wheel suitable for use on a child's wagon and intended as a substitute or to be used in place of a wire or wooden-spoke wheel, where the purchaser may prefer a solid disc in place of the usual type having spokes.

A further object is to provide a wheel of such construction that the load is transmitted directly from the hub to the rim without any shearing strain on the connecting means between the discs and the rim.

Other objects of the invention will appear from the following detailed description.

The invention consists generally in various constructions and combinations all as hereinafter described and pointed out in the claims.

In the accompanying drawings forming part of this specification,

Figure 1:
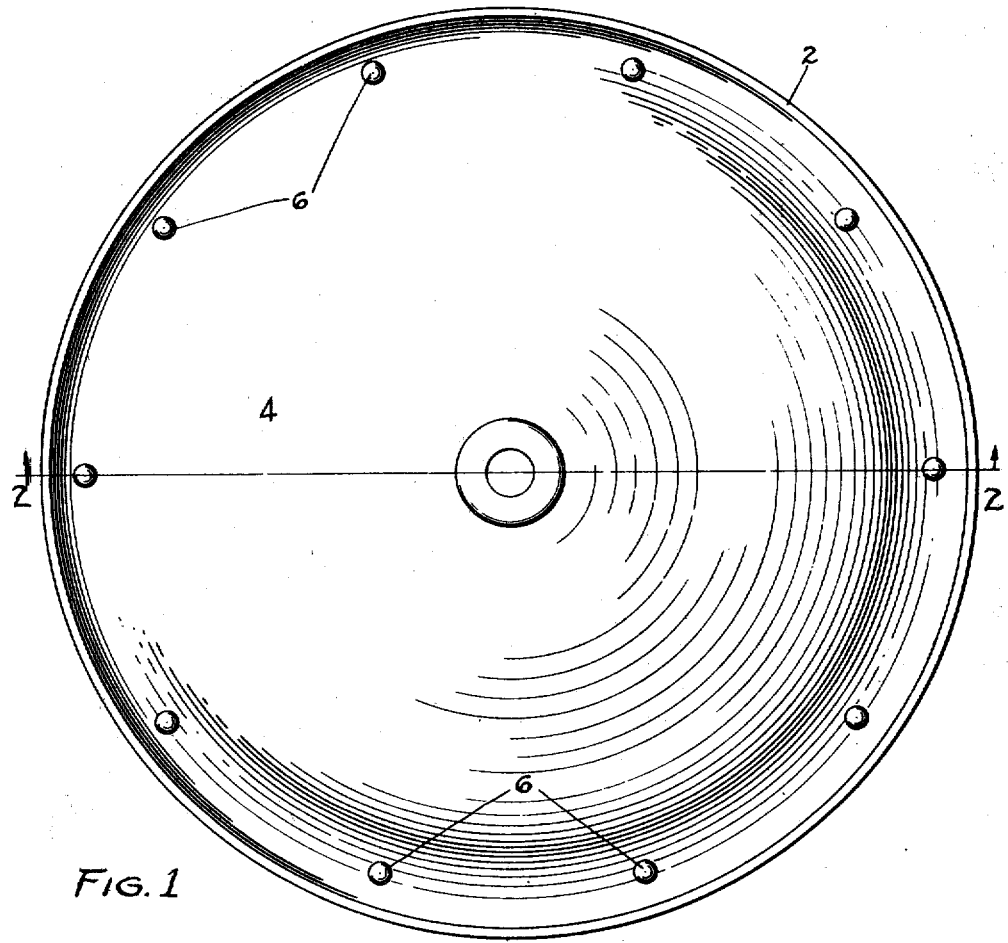
Figure 1 is a side elevation of a wheel embodying my invention.

In the drawings, 2 represents the rim of the wheel having an inwardly extending centrally arranged flange 3, the cross-section of the rim being substantially in the form of the letter T. The rim 2 forms the tread of the wheel when no tire is used, and the edges of the rim serve as a means for holding the tire in place when it is desired to put one on the wheel.

Figure 2:
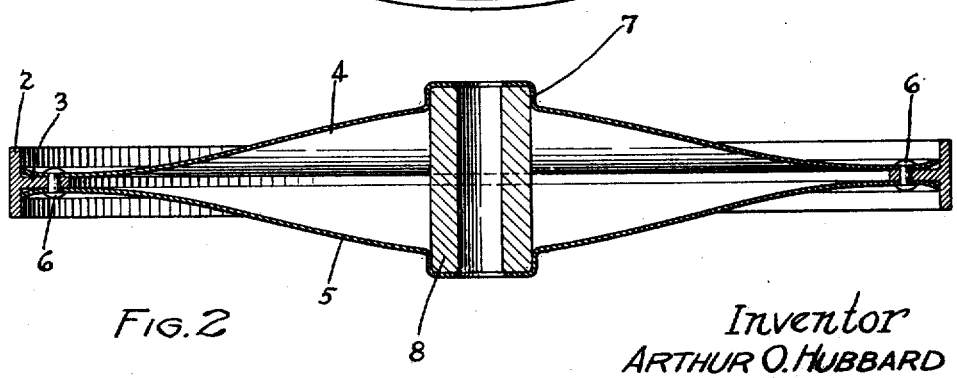
Figure 2 is a sectional view on the line 2—2 of Figure 1.

4 and 5 represent sheet metal plates, preferably steel, the edges of which are pressed within the rim 2 as indicated in Figure 2; and secured to the flange by suitable means such as rivets 6. These plates are of suitable gauge of metal and when pressed into the ring formed by the rim, serve as a support for the vehicle axle, transmitting the load from the hub to the rim.

The plates are slightly greater in diameter than the diameter of the wheel rim, so that when they are pressed into the rim, their edges will be turned outwardly as indicated in the drawing and thus the plates are adapted, and compensate for any slight variation in the diameter of the rims which may occur in the process of welding. When the discs are pressed within the rim, they remain in place during the process of punching and riveting, and it will not be necessary to accurately space holes in the plates and wheel rim as all three pieces will be punched at the same time; thus all fitting of the plates and rim when the parts are assembled is unnecessary and the expense of manufacture is considerably reduced.

The edges of the disc bearing snugly against the inner face of the rim, it follows that the load applied to the central portion of the disc will be transmitted therethrough to the rim without any tendency to shear off or weaken the rivets which secure the disc to the annular internal flange. Any suitable hub may be provided in this wheel. I prefer, however, to form sockets 7 in the central portion of the disc between which the hub 8 is mounted. This, however, is only one of many hub constructions which may be employed. In practice, I may prefer and provide ball bearings between the hub and the axle. This however, is a common construction in devices of this kind, and I do not think it necessary to describe it in detail herein.

I claim as my invention:

1. A wheel comprising a non-expansible rim having an inwardly projecting annular flange, sheet metal discs provided upon opposite sides of said flange and of slightly greater diameter than said rim, their edges when said discs are pressed into the rim being outwardly turned by such pressure adapting the discs to variations in the diameters of the rims, said discs being seated on said flange, the edges of the discs bearing snugly against the inner face of said rim and transmitting the load from the hub to said rim, means for clamping said discs and flange together and a suitable hub centrally mounted in said discs.

2. A wheel comprising a non-expansible rim, T-shaped substantially in cross-section, convex discs pressed into said rim upon opposite sides of its inwardly projecting flange, said discs being of slightly greater diameter than said rim whereby their edges will be outwardly turned when forced into said rim, said discs being seated on said flange by the pressing operation, and said discs and flange, when assembled, having rivet holes punched therein, and rivets fitting said holes and securing said discs and flange together.

In witness whereof, I have hereunto set my hand this 19th day of September, 1922.

ARTHUR O. HUBBARD.